G. T. WALLACE AND J. E. TWITCHELL.
ANTISKID CHAIN.
APPLICATION FILED DEC. 11, 1920.

1,393,986.

Patented Oct. 18, 1921.

Inventors
George T. Wallace,
James E. Twitchell,
By
Attorneys

UNITED STATES PATENT OFFICE.

GEORGE T. WALLACE AND JAMES E. TWITCHELL, OF DETROIT, MICHIGAN.

ANTISKID-CHAIN.

1,393,986.  Specification of Letters Patent.  Patented Oct. 18, 1921.

Application filed December 11, 1920. Serial No. 429,984.

*To all whom it may concern:*

Be it known that we, GEORGE T. WALLACE and JAMES E. TWITCHELL, citizens of the United States of America, residing at Detroit, in the county of Wayne and State of Michigan, have invented certain new and useful Improvements in Antiskid-Chains, of which the following is a specification, reference being had therein to the accompanying drawings.

This invention relates to non-skid tire devices, and has special reference to a single unit chain which may be used in an emergency, for instance, when encountering slippery pavements, muddy or sandy roads, and the single unit chains may be used in addition to the usual circumferential chains which are constantly used during a season of rain or snow.

The primary object of our invention is to provide individual anti-skid chains which may be easily and quickly mounted on a tire and located at intervals or such places where the chains will assist traction of a wheel on a slippery or shifting surface.

A further object of our invention is to provide a simple, durable and inexpensive non-skid chain embodying novel fasteners by which the chains may be safely anchored relative to a wheel, without injury thereto and without interfering with any other type of non-skid device carried by the wheel.

The above and other objects are attained by a construction which will be hereinafter specifically described and then claimed, and reference will now be had to the drawing, wherein Figure 1 is a perspective view of a detached non-skid chain;

Figure 2:
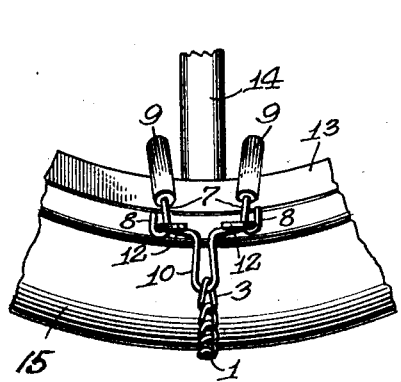
Fig. 2 is a side elevation of the same as applied to a portion of a wheel.
Figure 3:
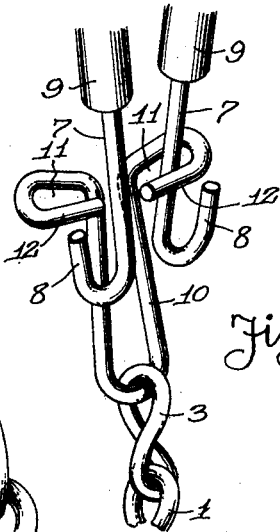
Fig. 3 is a perspective view of one of the fasteners of the non-skid chain, showing the same in an open position.
Figure 1:
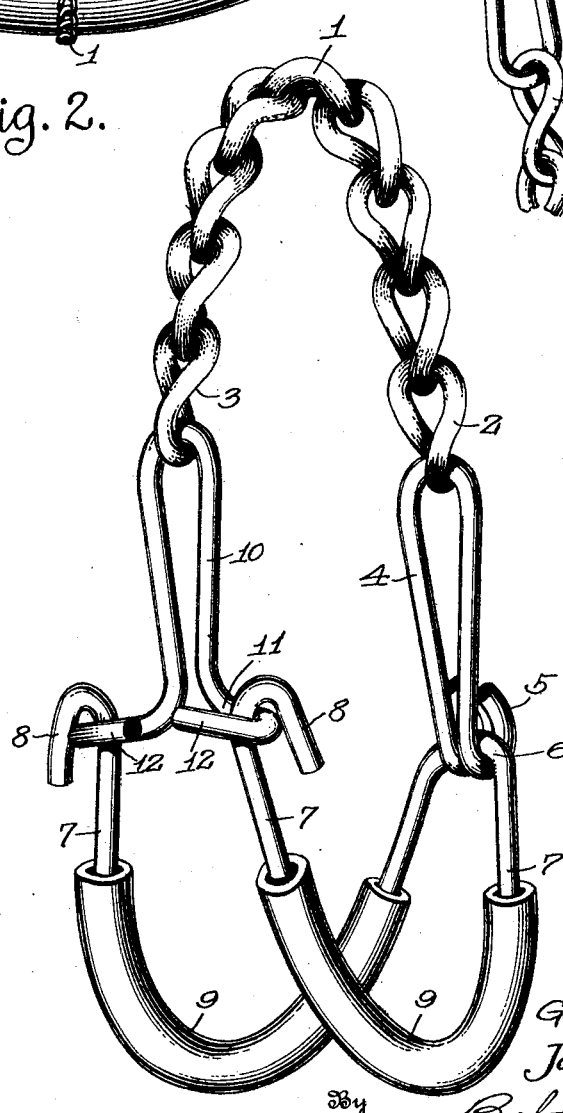

In the drawing, the reference numeral 1 denotes a piece of chain preferably of the close twisted link type which has one of its end links 2 provided with an inner fastener and its other end link 3 provided with an outer fastener. The inner fastener is in the form of a loop or link 4 having one end thereof loosely held by the link 2, and the opposite end thereof provided with closed eyes 5 disposed in parallelism and in contact with each other so as to close the loop or link 4.

Loosely mounted in the eyes 5 of the loop 4 is the closed end 6 of a yoke 7, said yoke having semi-circular arms terminating in hooks 8. The yoke arms have a degree of resiliency which permits of said arms being shifted relatively to each other so as to move the hooks 8 thereof, as will hereinafter appear. Mounted on the yoke arms are felly protecting members 9, preferably in the form of short pieces of rubber tubing which may be slipped on the yoke arms prior to forming the hooks 8.

The outer fastener comprises a loop or link 10 loosely carried by the link 3 of the chain 1 and the loop 10 has opposed laterally disposed hook members 11 with the bills 12 thereof extending toward each other. The hook members 11 are in proximity to each other so as to close the end of the loop or link 10 and prevent accidental displacement of the outer fastener relative to the link 3 of the chain 1, but with the loop or link 10 made of resilient wire or similar material the loop or link may have its members sufficiently separated to be snapped into engagement with the chain link 3. The resiliency of the loop or link 10 also permits of the hook members 11 somewhat separating when the anti-skid chain is in use, and to mount the chain on a wheel, the felly yoke 7 is placed on a wheel felly 13 at each side of a wheel spoke 14, as best shown in Fig. 2. The chain 1 is carried outside the tire 15 of the wheel and the hooks 8 placed in engagement with the hook members 11 of the outer fastener it being understood that the inner fastener is located at the inner side of the wheel so that easy access may be had to the outer fastener.

To place the hooks 8 in engagement with the hook members 11 of the outer fastener, the yoke arms are shifted toward each other so as to bring the hooks 8 into proximity to each other, and then, the hooks 8 may be passed between the bills 12 of the hook members 11 and when the yoke arms are released the hooks 8 will engage in the outer portions of the hook members 11. There are different ways in which the hooks 8 may be placed in engagement with the outer fastener, but when the chain 1 is properly held relative to the yoke 7, as shown in Fig.

2, the anti-skid chain has a limited movement on the tire 15 and in being yieldably held it will not injure a tire, but will at all times be in place to prevent the tire from skidding on a smooth or slippery surface.

It is thought that the utility of our invention will be apparent without further description, and while in the drawing there is illustrated a preferred embodiment of our invention as now in use we do not care to confine ourselves to the precise construction other than defined by the appended claims.

What we claim is:—

The combination of a single anti-skid chain, felly engaging U-shaped arms adapted to extend from the inner side of a felly to the outer side thereof and have the outer ends of said arms sprung toward each other, said chain having the inner end thereof held by said arms, and a fastener constituting the sole connecting means between the outer end of said chain and the outer ends of said arms, said fastener comprising a link having opposed lateral hook members into which the outer ends of said arms may be sprung by laterally shifting the outer ends of said arms toward each other, said hook members being in proximity to each other and maintaining said link in engagement with said chain.

In testimony whereof we affix our signatures in presence of two witnesses.

GEORGE T. WALLACE,
JAMES E. TWITCHELL.

Witnesses:
  ANNA M. DORR,
  ANNA C. RAVILER.